(12) United States Patent
Fujimoto et al.

(10) Patent No.: US 6,372,384 B1
(45) Date of Patent: Apr. 16, 2002

(54) RECHARGEABLE LITHIUM BATTERY COMPRISING SUBSTITUTED LITHIUM TITANATE ELECTRODES

(75) Inventors: Hiroyuki Fujimoto, Toyonaka; Hiroshi Nakajima, Hirakata; Nobumichi Nishida, Tokushima; Hiroshi Watanabe, Sumoto; Shin Fujitani, Hirakata, all of (JP)

(73) Assignee: Sanyo Electric Co., Ltd., Moriguchi (JP)

( * ) Notice: Subject to any disclaimer, the term of this patent is extended or adjusted under 35 U.S.C. 154(b) by 0 days.

(21) Appl. No.: 09/535,958

(22) Filed: Mar. 27, 2000

(30) Foreign Application Priority Data

Mar. 25, 1999 (JP) .......................... 11-081231

(51) Int. Cl.$^7$ .............................................. H01M 4/58
(52) U.S. Cl. ................................ 429/231.1; 429/231.95
(58) Field of Search ......................... 429/231.1, 231.95

(56) References Cited

U.S. PATENT DOCUMENTS

| 5,545,468 A | * | 8/1996 | Koshiba ..................... 429/218 |
| 5,591,546 A | * | 1/1997 | Nagaura ..................... 429/218 |
| 6,221,531 B1 | * | 4/2001 | Vaughey ................... 429/231.1 |

FOREIGN PATENT DOCUMENTS

| EP | 1057783 | * 12/2000 | ............ H01M/4/48 |
| JP | 06 275263 | 9/1994 | |
| JP | 07335261 | * 12/1995 | ............ H01M/4/02 |
| JP | 09 306491 | 11/1997 | |
| JP | 410251020 | * 9/1998 | ............ H01M/4/02 |
| JP | 410312826 | * 11/1998 | ............ H01M/10/40 |

OTHER PUBLICATIONS

"Structure and Electrochemistry of the Spinel Oxides $LiTi_2O_4$ and $Li_{4/3}Ti_{5/3}O_4$," by Colbow et al.; Journal of Power Sources, 26 (1989) pp. 397–402–, Elsevier Sequoia/ Printed in the Netherlands.

"Zero–Strain Insertion Material of $Li[Li_{1/3}Ti_{5/3}]O_4$ for Rechargeable Lithium Cells"; by Tsutomo Ohzuku et al.; J. Electrochem. Soc., vol. 142, No. 5, May, 1995, The Electrochemical Society, Inc.; pp. 1431–1435.

"Preparation of Micron–Sized $Li_4Ti_5O_{12}$ and Its Electrochemistry in Polyacrylonitrile Electrolyte–Based Lithium Cells"; by D. Peramunage et al.; Technical Papers Electrochemical Science and Technology; J. Electrochem. Soc. vol. 145, No. 8, Aug. 1998, The Electrochemical Society, Inc.; pp. 2609–2615.

* cited by examiner

*Primary Examiner*—Gabrielle Brouillette
*Assistant Examiner*—Mark Ruthkosky
(74) *Attorney, Agent, or Firm*—W. F. Fasse; W. G. Fasse

(57) ABSTRACT

A rechargeable lithium battery is disclosed having a positive electrode, a negative electrode and a non-aqueous electrolyte. The positive or negative electrode contains, as its active material, an Li—Ti complex oxide having a spinel crystal structure and represented by the compositional formula $Li_4M_xTi_{5-x}O_{12}$, wherein M is at least one element selected from V, Nb, Mo and P and x satisfies the relationship $0 < x \leq 0.45$.

13 Claims, 3 Drawing Sheets

RECHARGEABLE LITHIUM BATTERY COMPRISING SUBSTITUTED LITHIUM TITANATE ELECTRODES

BACKGROUND OF THE INVENTION

1. Field of the Invention

The present invention relates to a rechargeable lithium battery, and more particularly to a rechargeable lithium battery which utilizes the improved active material for its positive or negative electrode.

2. Description of Related Art

In recent years, rechargeable lithium batteries have been extensively developed. The performance characteristics of rechargeable batteries, such as charge-discharge voltages, charge-discharge cycle life characteristics and storage capabilities, depend largely on the particular electrode active material used. This has led to the search of various active materials.

In Japanese Patent Laid Open No. Hei 6-275263 (1994), a rechargeable lithium battery is disclosed which uses an Li—Ti complex oxide represented by the formula $Li_xTi_yO_4$. Such a rechargeable lithium battery utilizing the Li—Ti complex oxide for active material has been used as a power source for electronic devices, such as watches. Among various Li—Ti complex oxides, $Li_4Ti_5O_{12}$ having a spinel structure has been reported as allowing a larger amount of lithium to be electrochemically reversibly inserted thereinto and extracted therefrom, with little modification of its crystal structure during repeated lithium. insertion-extraction cycles, so that it undergoes less deterioration during charge-discharge cycles (See, for example, T. Ohzuku, J. Electrochem. Soc., 142, p.1431, 1995). However, this active material has also been reported as being a compound having an extremely low electron conductivity (See, for example, K. M. Colbow, J. Power Sources, 26, p.397, 1989). This property has imposed problems, such as creating a high reaction resistance during lithium insertion and extraction or resulting in a marked reduction of characteristics at heavy loads, making it difficult for the active material to be applied to battery systems requiring discharge at heavy loads. The use of such an active material, in the form of fine particles, has been recently contemplated to improve battery characteristics (See, for example, D. Peramunage, J. Electrochem. Soc., 145, p.2609, 1998).

However, the attempt of simply subdividing particles has been still insufficient to achieve improvements of discharge characteristics at heavy loads.

SUMMARY OF THE INVENTION

The present invention is directed toward solving the above-described conventional problems and its object is to provide a rechargeable lithium battery which has imparted thereto good discharge load characteristics by utilizing the Li—Ti complex oxide as active material.

The rechargeable lithium battery of the present invention has a positive electrode, a negative electrode and a non-aqueous electrolyte. Characteristically, the positive or negative electrode contains, as its active material, an Li—Ti complex oxide represented by the compositional formula $Li_4M_xTi_{5-x}O^{12}$ and having a spinel crystal structure, wherein M is selected from at least one of V, Nb, Mo and P, and x satisfies the relationship $0<x\leq 0.45$.

In accordance with the present invention, the inclusion of the element M (at least one of V, Nb, Mo and P) in the crystal lattice of Li—Ti complex oxide results in the reduced reaction resistance when lithium is inserted into or extracted from the active material. The use of the above-specified Li—Ti complex oxide for active material of the positive or negative electrode thus leads to the improvement in load characteristics of the rechargeable lithium battery.

In the present invention, those elements which, when introduced into $Li_4Ti_5O_{12}$, showed appreciable contribution to the improvement in load characteristics are specified herein as the elements M. Ti in the composition $Li_4Ti_5O_{12}$ is present in the tetravalent cation form. The element M, as specified in the present invention, is the element which exists in a stable pentavalent or hexavalent cation form in an oxide thereof. It is thus believed that the introduction of the element M into the composition $Li_4Ti_5O_{12}$ increases a density of electrons which contribute to the electron conductivity in the crystal to result in the increased electron conductivity of the resulting complex oxide, which effectively decreases the reaction resistance.

In the present invention, the stoichiometry x of the element M in the above-specified compositional formula is maintained not to exceed 0.45. If the inclusion of the element M exceeds 0.45, an oxide phase of M only may be produced to result in lowering the improving effect of load characteristics.

In the present invention, the aforementioned Li—Ti complex oxide for use as the positive or negative active material has a spinel crystal structure. The presence of such a crystal structure can be identified by X-ray diffraction (XRD).

An electrolyte solvent for use in the rechargeable lithium battery according to the present invention can be selected from non-aqueous electrolyte solvents generally employed for rechargeable lithium batteries. Specifically, it may be a mixed solvent of cyclic carbonate and chain carbonate, for example. Examples of cyclic carbonates include ethylene carbonate, propylene carbonate and butylene carbonate. Examples of chain carbonates include dimethyl carbonate, methyl ethyl carbonate and diethyl carbonate. The electrolyte solvent may alternatively be a mixed solvent of the aforestated cyclic carbonate and an ether solvent, for example. Examples of ether solvents include 1,2-dimethoxyethane, 1,2-diethoxyethane and the like. Examples of useful electrolyte solutes include $LiPF_6$, $LiBF_4$, $LiCF_3SO_3$, $LiN(CF_3SO_2)_2$, $LiN(C_2F_5SO_2)_2$, $LiN(CF_3SO_2)(C_4F_9SO_2)$, $LiC(CF_3SO_2)_3$, $LiC(C_2F_5SO_2)_3$ and any combination thereof, for example. Other applicable electrolytes include gelled polymer electrolytes wherein a liquid electrolyte is impregnated in polymers such as polyethylene oxide and polyacrylonitrile, and inorganic solid electrolytes such as LiI and $Li_3N$, for example.

In the present invention, any non-aqueous electrolyte can be used, so long as it contains an Li compound as a solute for realizing an ionic conductivity, and a solvent used to dissolve and hold the solute is hardly decomposed at voltages during battery charge, discharge and storage.

In the case where the aforementioned Li—Ti complex oxide is used as the positive active material, a suitable negative active material may be chosen from carbon materials capable of electrochemical storage and release of Li, such as graphite (either natural or synthetic), coke, and calcined organics; Li alloys such as Li—Al, Li—Mg, Li—In, Li—Al—Mn alloys; and metallic Li. In such instances, a charge voltage of about 3.0 V and discharge voltage of about 1.0–1.5 V will be given.

In the case where the aforementioned Li—Ti complex oxide is used as the negative active material, a lithium-containing transition metal oxide, such as $LiCoO_2$, $LiNiO_2$, $LiMn_2O_4$, $LiMnO_2$, lithium-containing $MnO_2$, $LiCo_{0.5}Ni_{0.5}O_2$, $LiNi_{0.7}Co_{0.2}Mn_{0.1}O_2$, $LiCo_{0.9}Ti_{0.1}O_2$, $LiCo_{0.5}Ni_{0.4}Zr_{0.1}O_2$ or the like, can be used as the positive active material. In such instances, a charge voltage of about 2.7–3.0 V and a. discharge voltage of about 2.5 V will be given. Those batteries are generally assembled in a discharged state and can be brought to a dischargeable condition by first charging them, i.e., by allowing Li present in the positive active material to migrate into the negative active material. The above-listed positive active materials are under continued study for use in rechargeable lithium batteries requiring relatively large current densities, and their use is more effective in achieving the improvement of load characteristics as contemplated in the present invention.

The Li—Ti complex oxide of the present invention can be synthesized by calcining a mixture of materials containing its constituent elements. The calcining temperature may preferably be within the range of 800° C.–950° C. If the calcining temperature is below 800° C., the production of Li—Ti complex oxide having a spinel structure may become incomplete to result in the failure to obtain a sufficient effect from the introduction of the element M. On the other hand, if the calcining temperature exceeds 950° C., the production of a separate phase, such as $Li_2Ti_3O_7$, may result which could cause the reduction in discharge capacity or in discharge load characteristics.

The electrode active material of the present invention, for use in rechargeable lithium batteries, is characterized as containing an Li—Ti complex oxide represented by the compositional formula $Li_4M_xTi^{5-x}O^{12}$ and having a spinel crystal structure, wherein M is selected from at least one of V, Nb, Mo and P, and x satisfies the relationship $0<x\leq 0.45$.

The use of this electrode active material for rechargeable lithium batteries results in the improvement of discharge characteristics at heavy loads.

DESCRIPTION OF PREFERRED EXAMPLES

Figure 1:
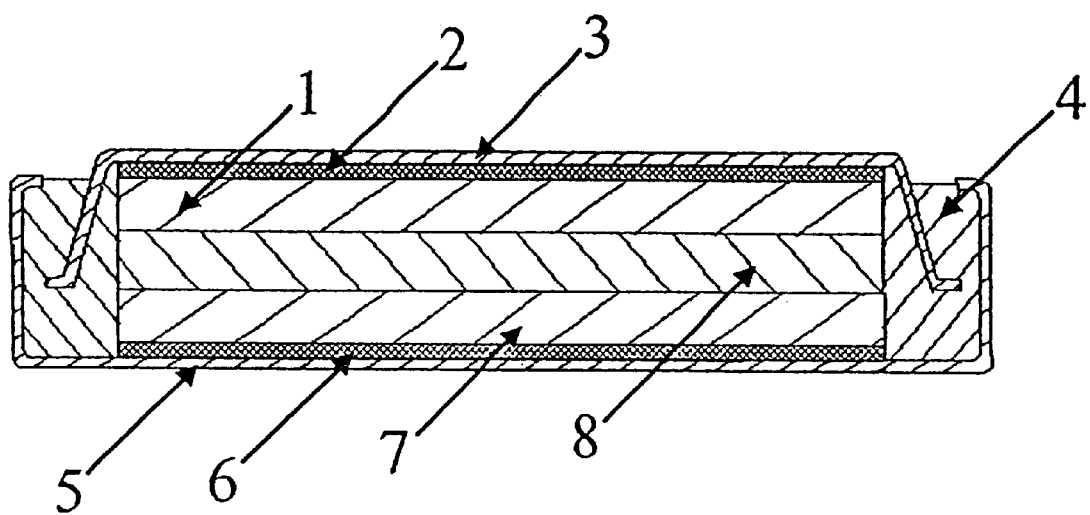
FIG. 1 is a sectional view, showing a construction of a coin type rechargeable lithium battery embodiment in accordance with the present invention.

The present invention is now described in more detail with reference to preferred examples. It will be recognized that the following examples merely illustrate the practice of the present invention but are not intended to be limiting thereof. Suitable changes and modifications can be effected without departing from the scope of the present invention.

EXAMPLE 1

Coin type batteries were assembled utilizing natural graphite as active material of a negative electrode, and the Li—Ti complex oxide of the present invention, i.e., $Li_4M_{0.2}Ti_{4.8}O_{12}$ (M is V, Nb, Mo or P) as active material of a positive electrode. Each battery was measured for discharge load characteristics. In Example 1, the type of element M introduced was altered to investigate its effect on the discharge load characteristics.

(A) Positive Electrode Preparation

LiOH, $TiO_2$(anatase) and $V_2O_5$ reagents, as starting materials, were respectively weighed such that a ratio of numbers of Li, V and Ti atoms was brought to 4:0.2:4.8, and then mixed in a mortar. The mixture was pressed in a 17 mm-diameter mold at a pressure of 115 kg/cm$^2$ into a shape, and then calcined under ambient atmosphere at 800° C. for 10 hours to obtain a calcined product of $Li_4V_{0.2}Ti_{4.8}O_{12}$. This calcined product was subsequently crushed in a mortar into particles with an average particle size of 10 µm.

85 parts by weight of the $Li_4V_{0.2}Ti_{4.8}O_2$ powder, 10 parts by weight of carbon powder as a conductive agent, and 5 parts by weight of poly(vinylidene fluoride) powder as a binder were mixed. By adding this mixture to an N-methyl-2-pyrrolidone (NMP) solution, a slurry was formed.

The slurry was applied by a doctor blade technique onto one surface of a 20 µm thick copper current collector to form an active material layer thereon. The current collector carrying the active material layer thereon was dried at 150° C. and then punched to remove therefrom a disc-form positive electrode having a diameter of 10 mm and a thickness of about 200 µm.

(B) Li Insertion Into Positive Electrode $LiPF_6$ was dissolved in a mixed solvent consisting of equivolume of ethylene carbonate and diethyl carbonate to a concentration of 1 mole/l to obtain an electrolyte solution. The above-prepared positive electrode, metallic Li and a microporous polypropylene membrane placed therebetween were immersed in the electrolyte solution, and then subjected to electrolysis at a constant current of 100 µA to 1.2 V versus Li/Li$^+$, so that Li was inserted into the positive electrode. This Li-inserted positive electrode was used in the below-described battery assembly (E).

(C) Negative Electrode Preparation 95 parts by weight of natural graphite powder and 5 parts by weight of poly(vinylidene fluoride) powder were mixed. A slurry was formed by adding this mixture to an NMP solution. This slurry was applied by a doctor blade technique onto one surface of a 20 µm thick copper current collector to form an active material layer thereon. The current collector carrying the active material layer thereon was dried at 150° C. and then punched to remove therefrom a disc-form negative electrode having a diameter of 10 mm and a thickness of about 110 µm. The negative electrode thus prepared was used in the below-described battery assembly (E).

(D) Electrolyte Preparation $LIPF_6$ was dissolved in a mixed solvent consisting of equivolume of ethylene carbonate and diethyl carbonate to a concentration of 1 mole/l to obtain an electrolyte solution. This electrolyte solution was used in the subsequent battery assembly (E).

(E) Battery Assembly

By utilizing the positive electrode, negative electrode and electrolyte solution respectively prepared in (B), (C) and (D), a coin type rechargeable lithium battery A-1 of Example 1, shown in FIG. 1, was assembled. FIG. 1 is a schematic sectional view, showing a rechargeable lithium battery construction of Example 1 as such assembled. As shown in FIG. 1, the positive electrode 1 and negative electrode 7 are disposed on opposite sides of a separator 8 comprised of a microporous polypropylene membrane. The positive electrode 1, negative electrode 7 and separator 8 are accommodated in a battery case defined by a positive can 3 and a negative can 5. The positive electrode 1 is electrically coupled to the positive can 3 by a positive current collector 2, and the negative electrode 7 to the negative can 5 by a negative current collector 6. An insulating polypropylene gasket 4 physically separates the respective peripheries of the positive can 3 and the negative can 5 to prevent short-circuiting thereof. Such arrangements lead to the secondary battery construction which has the ability to be charged and recharged.

In order to investigate how the type of element M affects the discharge load characteristics of a resulting battery, rechargeable lithium batteries A-2, A-3 and A-4 of Example 1 were assembled by following the above-described procedures, with the exception that $V_2O_5$, as one starting material used in the procedure (A), was altered to $Nb_2O_5$, $MoO_3$ or $P_4O_{10}$.

Comparative Example 1

The procedure of Example 1 was followed, except that $Li_4Ti_5O_{12}$ was used as the positive active material, to assemble a coin type battery B-1 of Comparative Example 1.

(F) Measurement of Discharge Load Characteristics

Each battery was charged at a current of 100 μA at 25° C. to 3.0 V and then discharged at a current of 100 μA or 2 mA to 1.0 V. A ratio of a discharge capacity at 2 mA to a discharge capacity at 100 μA, for each battery, is given in Table 1. For each battery, a discharge voltage was about 1.4 V, on average, and a discharge capacity at 100 μA was 4–4.5 mAh.

TABLE 1

| Designation of Battery | Positive Active Material | Negative Active Material | Ratio (%) of Discharge Capacity at 2 mA to 100 μA |
|---|---|---|---|
| A 1 | $Li_4V_{0.2}Ti_{4.8}O_{12}$ | Graphite | 82 |
| A 2 | $Li_4Nb_{0.2}Ti_{4.8}O_{12}$ | Graphite | 83 |
| A 3 | $Li_4Mo_{0.2}Ti_{4.8}O_{12}$ | Graphite | 81 |
| A 4 | $Li_4P_{0.2}Ti_{4.8}O_{12}$ | Graphite | 80 |
| B 1 | $Li_4Ti_5O_{12}$ | Graphite | 51 |

As apparent from Table 1, the batteries A-1 through A-4 according to the present invention exhibit 80–83% for the ratio of discharge capacity at 2 mA to 100 μA to demonstrate their superior discharge load characteristics. On the other hand, the battery B-1 of Comparative Example 1 using $Li_4Ti_5O_{12}$ for the positive active material exhibits 51% for the ratio of discharge capacity at 2 mA to 100 μA to show inferior discharge load characteristics relative to the batteries of the present invention. The improvement in discharge load characteristic of the batteries according to the present invention is believed attributable to the inclusion of the element M having a valence of greater than 4 in the crystal lattice of the Li—Ti complex oxide, whereby a density of electrons that participate in electron conduction in the crystal increases to result in the increased electron conductivity of the active material, which effectively reduces the reaction resistance when lithium is inserted into or extracted from the active material.

EXAMPLE 2

Coin type batteries A-5, A-6 and A-7 of Example 2 were assembled utilizing $Li_4V_{0.2}Ti_{4.8}O_{12}$ for their negative active material and lithium-containing transition metal compounds, i.e., $LiCoO_2$, $LiNiO_2$ and $LiMn_2O_4$ (See, for example, T. Ohzuku and A. Ueda, Solid State Ionics, 69, p.201 (1994)) for their respective positive active materials. Each battery was measured for discharge load characteristics.

The procedure (A) used in Example 1 for preparation of the positive electrode was followed to obtain $Li_4V_{0.2}Ti4.8O_{12}$ for use as an active material of a negative electrode. The procedures (D) and (E) used in Example 1 were followed to prepare the electrolyte solution and to assemble batteries. The procedure (B) used in Example 1 for insertion of lithium into the positive electrode (negative electrode in this case) was not carried out in Example 2. A positive electrode was prepared according to the following procedure.

(A') Positive Electrode Preparation $Li_2CO_3$ and $CoCO_3$, as starting materials, were weighed such that a ratio of numbers of Li and Co atoms was brought to 1:1, and then mixed in a mortar. The mixture was pressed in a 17 mm-diameter mold at a pressure of 115 kg/cm² into a shape, and then calcined in the air at 800° C. for 24 hours to obtain a calcined product of $LiCoO_2$. The calcined product was subsequently crushed in a mortar to particles with an average particle size of 10 μm for use as the positive active material.

85 parts by weight of the $LiCoO_2$ powder, 10 parts by weight of carbon powder as a conductive agent, and 5 parts by weight of poly(vinylidene fluoride) powder as a binder were mixed. By adding this mixture to an N-methyl-2-pyrrolidone (NMP) solution, a slurry was formed. The slurry was coated by a doctor blade technique onto one surface of a 20 μm thick aluminum current collector to form an active material layer thereon. The current collector carrying the active material layer thereon was dried at 150° C. and then punched to remove therefrom a disc-form positive electrode having a diameter of 10 mm and a thickness of about 150 μm.

Similarly, $LiNO_3$ and NiO, as starting materials, were weighed such that a ratio of numbers of Li and Ni atoms was brought to 1:1, and then mixed in a mortar. The mixture was pressed in a 17 mm-diameter mold at a pressure of 115 kg/cm² into a shape and then calcined under oxygen atmosphere at 700° C. for 48 hours to obtain a calcined product of $LiNiO_2$. The calcined product was crushed in a mortar to particles with an average particle size of 10 μm for use as positive active material. Thereafter, a slurry was formed and processed in the same manner as described above to prepare a positive electrode which contained $LiNiO_2$ as the active material.

Also similarly, $LiOH.H_2O$ and $MnO_2$, as starting materials, were weighed such that a ratio of numbers of Li and Mn atoms was brought to 1:2, and then mixed in a mortar. The mixture was pressed in a 17 mm-diameter mold at a pressure of 115 kg/cm² into a shape and then calcined in the air at 650° C. for 48 hours to obtain a calcined product of $LiMn_2O_4$. The calcined product was crushed in a mortar to particles with an average particle size of 10 μm for use as positive active material. Thereafter, a slurry was formed and processed in the same manner as described above to prepare a positive electrode which contained $LiMn_2O_4$ as the active material.

Comparative Example 2

The procedure of Example 2 was followed, utilizing $Li_4Ti_5O_{12}$ as the negative active material and $LiMn_2O_4$ as the positive active material, to assemble a coin type battery B-2 of Comparative Example 2.

(F') Measurement of Discharge Load Characteristics

Each battery was charged at a current of 100 μA at 25° C. to 2.8 V and then discharged at a current of 100 μA or 2 mA to 2.0 V. Each battery was measured for a ratio of discharge capacity at 2 mA to 100 μA. The results are given in Table 2. For each battery, a discharge voltage was about 2.5 V, on average, and a discharge capacity at 100 μA was 4–4.5 mAh.

TABLE 2

| Designation of Battery | Positive Active Material | Negative Active Material | Ratio (%) of Discharge Capacity at 2 mA to 100 μA |
|---|---|---|---|
| A 5 | $LiCoO_2$ | $Li_4V_{0.2}Ti_{4.8}O_{12}$ | 82 |
| A 6 | $LiNiO_2$ | $Li_4V_{0.2}Ti_{4.8}O_{12}$ | 80 |
| A 7 | $LiMn_2O_4$ | $Li_4V_{0.2}Ti_{4.8}O_{12}$ | 79 |
| B 2 | $LiMn_2O_4$ | $Li_4Ti_5O_{12}$ | 48 |

As apparent from the results shown in Table 2, even in the case where the Li—Ti complex oxide according to the present invention was used as the active material of the negative electrode, the batteries A-5 through A-7 exhibit high percentages, i.e., 79–82% for the ratio in discharge capacity at 2 mA to 100 μA to demonstrate their superior discharge load characteristics. Also, the battery systems of Example 2 do not require lithium to be preinserted into the Li—Ti complex oxide according to the present invention, and are able to obtain high voltages.

EXAMPLE 3 and

Comparative Example 3

Coin type batteries were assembled utilizing the Li—Ti complex oxide according to the present invention, $Li_4V_xTi_{5-x}O_{12}$, for the negative active material and $LiMn_2O_4$ for the positive active material, wherein the stoichiometry x of the element V introduced was varied to investigate its effect on discharge load characteristics of resulting batteries. The procedure of Example 1 was followed, except that the ratio of numbers of V and Ti atoms was varied, to prepare $Li_4V_{0.01}Ti_{4.99}O_{12}$, $Li_4V_{0.02}Ti_{4.98}O_{12}$, $Li_4V_{0.03}Ti_{4.97}O_{12}$, $Li_4V_{0.1}Ti_{4.9}O_{12}$, $Li_4V_{0.3}Ti_{4.7}O_{12}$, $Li_4V_{0.4}Ti_{4.6}O_{12}$ and $Li_4V_{0.45}Ti_{4.55}O_{12}$ for use as active materials. Coin type batteries A-8 through A-14 of Example 3 were assembled utilizing these substances for their respective negative active materials and $LiMn_2O_4$ for their positive active material. Also, $Li_4V_{0.5}Ti_{4.5}O_{12}$ and $Li_4V_{0.52}Ti_{4.48}O_{12}$ were prepared by further varying the ratio of number of V and Ti atoms, and coin type batteries B-3 and B-4 of Comparative Example 3 were assembled utilizing those substances as their respective negative active materials.

Figure 2:
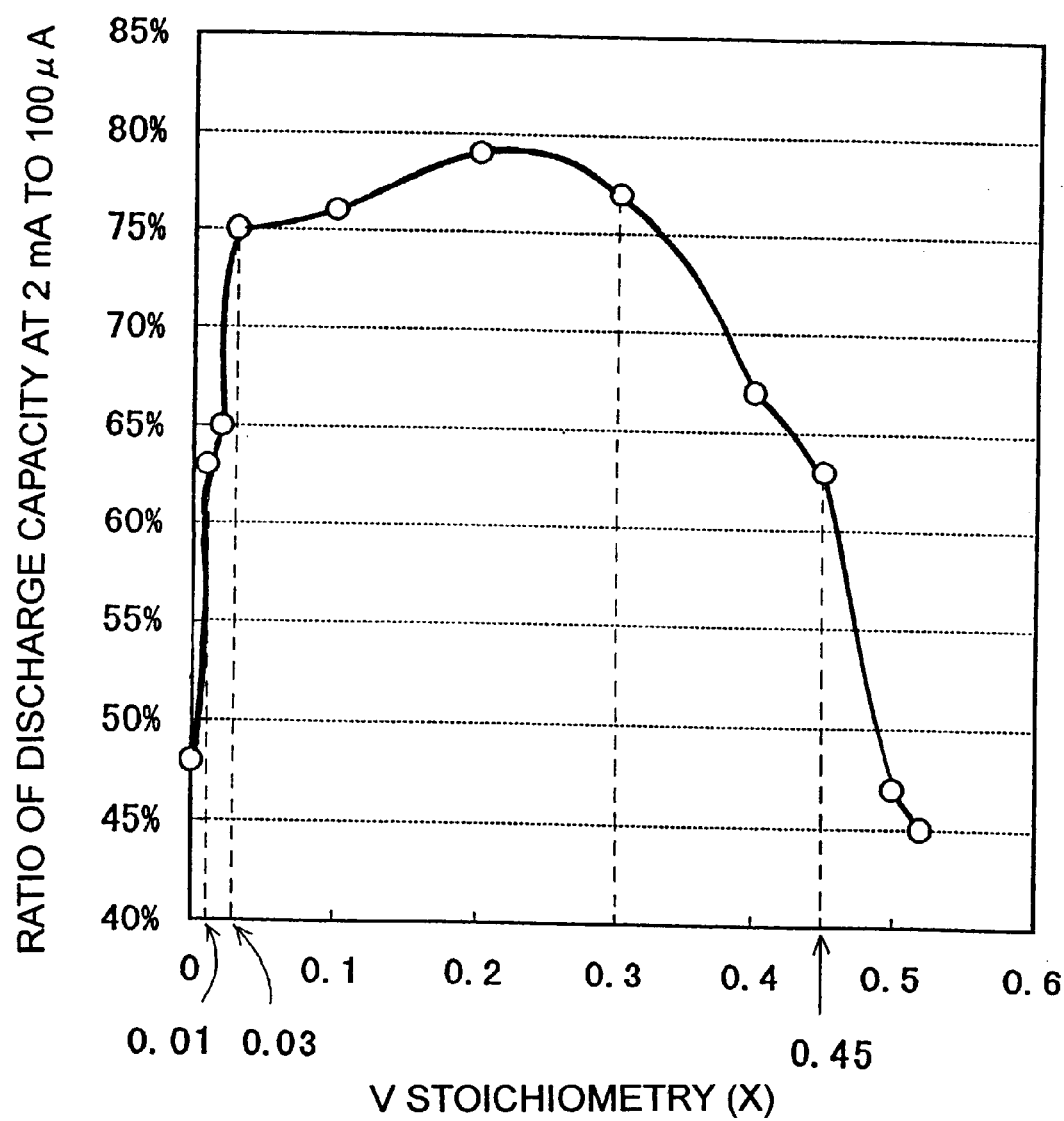
FIG. 2 is a graph showing the relationship between the V stoichiometry x in the formula $Li_4V_xTi_{5-x}O_{12}$ and the discharge load characteristics of the battery utilizing the $Li_4V_xTi_{5-x}O_{12}$ active material.

These batteries were measured for discharge load characteristics in the same manner as in Example 1. The results are given in FIG. 2. In FIG. 2, the results for the battery A-7 of the present invention and the comparative battery B-2 are also shown. Each battery exhibited a discharge voltage of 2.5 V, on average, and a discharge capacity at 100 μA of 4–4.5 mAh.

As can be appreciated from FIG. 2, the batteries exhibit good discharge load characteristics when the V stoichiometry x does not exceed 0.45. Particularly when the V stoichiometry x is in the range $0.01 \leq x \leq 0.45$, the ratio of discharge capacity at 2 mA to 100 μA is within the range of 63–79%, showing excellent discharge load characteristics. Furthermore, when the V stoichiometry x is in the range $0.03 \leq x \leq 0.3$, the ratio of discharge capacity at 2 mA to 100 μA is within the range of 75–79%, showing particularly excellent discharge load characteristics.

If the V stoichiometry x exceeds 0.45, an oxide phase of V only may be deposited which is considered to suppress the contemplated effect of improving electron conductivity and reducing the reaction resistance.

EXAMPLE 4

Figure 3:
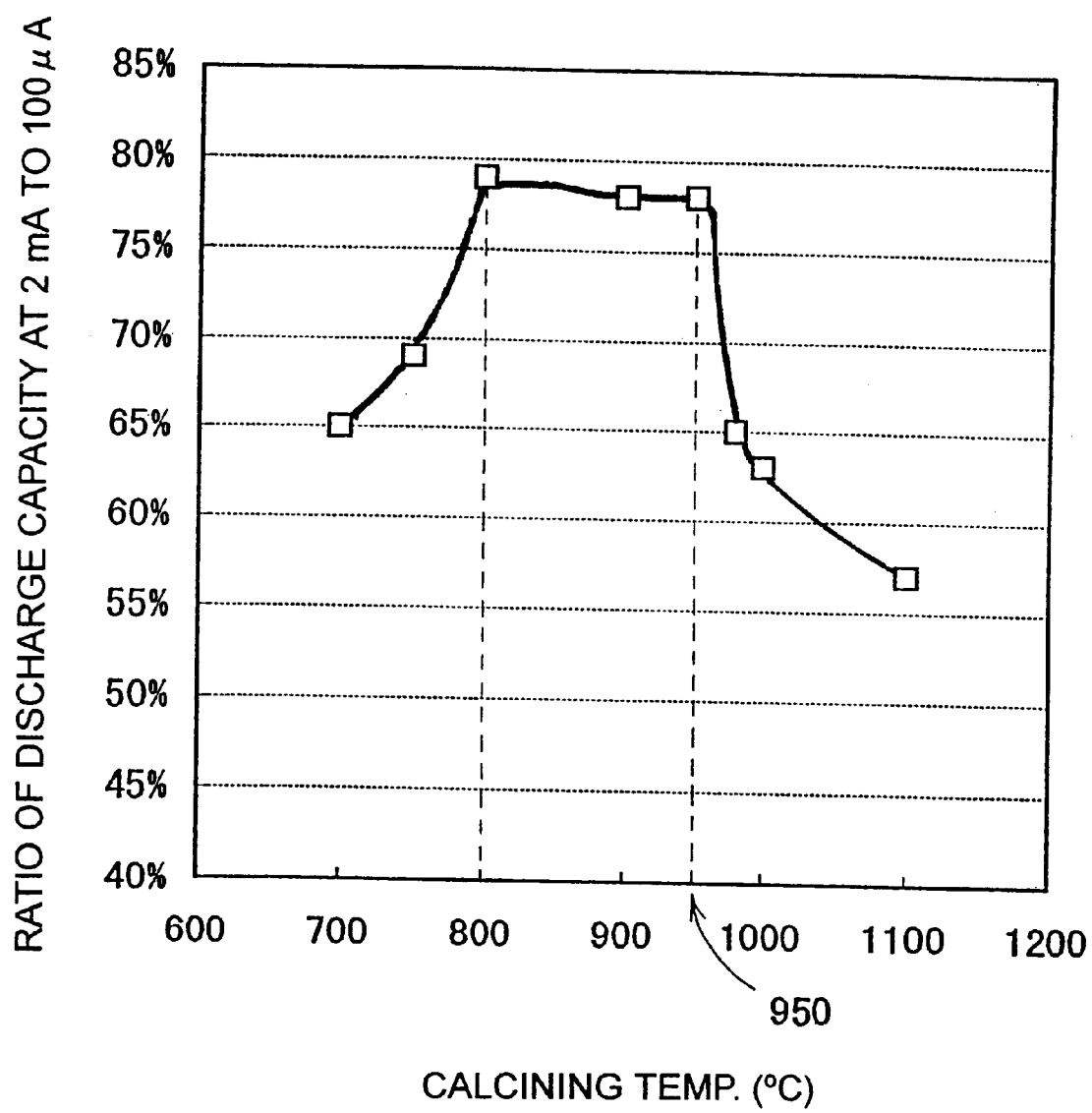
FIG. 3 is a graph showing the relationship between the calcining temperature used in synthesizing $Li_4V_{0.2}Ti_{4.8}O_{12}$ and the discharge load characteristics of the battery utilizing the $Li_4V_{0.2}Ti_{4.8}O_{12}$ active material.

Coin type batteries were assembled utilizing the Li—Ti complex oxide according to the present invention, $Li_4V_{0.2}Ti_{4.8}O_{12}$, for the negative active material, wherein the calcining temperature for use in the preparation of the $Li_4V_{0.2}Ti_{4.8}O_{12}$ active material was varied to investigate its effect on discharge load characteristics of resulting batteries. The procedure of Example 1 was followed, except that the calcining temperature under oxygen (ambient) atmosphere used in (A) of Example 1 for positive electrode preparation was varied from 800° C. to 700° C., 750° C., 900° C., 950° C., 980° C., 1,000° C. or 1,100° C., to prepare active materials. Coin type batteries A-15 through A-21 of Example 4 were assembled utilizing the substances such prepared for their respective negative active materials and $LiMn_2O_4$ for their positive active material. Each battery was measured for discharge load characteristics. The results are given in FIG. 3. In FIG. 3, the result for the battery A-7 is also shown. Each battery exhibited a discharge voltage of 2.5 V, on average, and a discharge capacity at 100 μA of 4–4.5 mAh.

As shown in FIG. 3, the batteries according to the present invention exhibit the discharge capacity ratios within the range of 57–79%, regardless of the particular calcining temperature used, to demonstrate their excellent discharge load characteristics. Particularly when the calcining temperature is within the range of 800° C.–950° C., the discharge capacity ratios are higher, in the range of 78–79%, demonstrating particularly excellent discharge load characteristics.

The rechargeable lithium battery of the present invention utilizes the Li—Ti complex oxide represented by the formula $Li_4M_xTi_{5-x}O_2$ as active material of a positive or negative electrode. This complex oxide is the active material excellent in electron conductivity. Therefore, its use results in the reduced reaction resistance when lithium is inserted or extracted during the charge-discharge process, which enables discharging at heavy loads and thus improves the discharge load characteristics of resulting batteries.

The use of the electrode active material of the present invention for rechargeable lithium batteries results in the improved discharge load characteristics thereof.

What is claimed is:

1. A rechargeable lithium battery having a positive electrode, a negative electrode and a non-aqueous electrolyte; said positive electrode containing, as its active material, an Li—Ti complex oxide having a spinel crystal structure and represented by the compositional formula $Li_4M_xTi_{5-x}O_{12}$, wherein M is at least one element selected from V, Nb, Mo and P and x satisfies the relationship $0<x\leq 0.45$.

2. The rechargeable lithium battery of claim 1, wherein said x satisfies the relationship $0.03 \leq x \leq 0.3$.

3. The rechargeable lithium battery of claim 1, wherein said negative electrode contains, as its active material, lithium-free or lithium-containing carbon material.

4. The rechargeable lithium battery of claim 1, wherein said Li—Ti complex oxide is synthesized by calcining a mixture of materials containing its constituent elements at a temperature within the range of 800–950° C.

5. A rechargeable lithium battery having a positive electrode, a negative electrode and a non-aqueous electrolyte; said negative electrode containing, as its active material, an Li—Ti complex oxide having a spinel crystal structure and represented by the compositional formula $Li_4M_xTi_{5-x}O_{12}$, wherein M is at least one element selected from V, Nb, Mo and P and x satisfies the relationship $0<x\leq0.45$.

6. The rechargeable lithium battery of claim 5, wherein said x satisfies the relationship $0.03\leq x\leq0.3$.

7. The rechargeable lithium battery of claim 5, wherein said positive electrode contains, as its active material, a lithium-containing transition metal oxide.

8. The rechargeable lithium battery of claim 5, wherein said Li—Ti complex oxide is synthesized by calcining a mixture of materials containing its constituent elements at a temperature within the range of 800–950° C.

9. An electrode active material, for use in rechargeable lithium batteries, comprising an Li—Ti complex oxide having a spinel crystal structure and represented by the compositional formula $Li_4M_xTi_{5-x}O_{12}$, wherein M is at least one element selected from V, Nb, Mo and P and x satisfies the relationship $0<x\leq0.45$.

10. The electrode active material of claim 9, wherein said x satisfies the relationship $0.03\leq x\leq0.3$.

11. The electrode active material of claim 9, wherein said Li—Ti complex oxide is synthesized by calcining a mixture of materials containing its constituent elements at a temperature within the range of 800–950° C.

12. A positive active material comprising the electrode active material of claim 9.

13. A negative active material comprising the electrode active material of claim 9.

* * * * *

UNITED STATES PATENT AND TRADEMARK OFFICE
CERTIFICATE OF CORRECTION

PATENT NO. : 6,372,384 B1  
DATED : April 16, 2002  
INVENTOR(S) : Fujimoto et al.

Page 1 of 1

It is certified that error appears in the above-identified patent and that said Letters Patent is hereby corrected as shown below:

Column 1,  
Line 61, replace "$Li_4M_xTi_{5-x}O^{12}$", by -- $Li_4M_xTi_{5-x}O_{12}$ --;

Column 3,  
Line 18, replace "800º C.-950º" by -- 800º C - 950º C --;  
Line 30, replace "$Li_4M_xTi^{5-x}O^{12}$" by -- $Li_4M_xTi_{5-x}O_{12}$ --;

Column 4,  
Line 7, replace "800º C. for" by -- 800º C for --;  
Line 11, replace "$Li_4V_{0.2}Ti_{4.8}O_2$", by -- $Li_4V_{0.2}Ti_{4.8}O_{12}$ --;  
Line 19, replace "150ºC." by -- 150ºC --;

Column 5,  
Line 24, replace "25ºC." by -- 25ºC --;

Column 6,  
Line 6, replace "$Li_4V_{0.2}Ti4.8O_{12}$" by -- $Li_4V_{0.2}Ti_{4.8}O_{12}$ --;  
Line 42, replace "700ºC." by -- 700ºC --;

Column 7,  
Line 2, replace "25ºC." by -- 25ºC --;

Column 8,  
Line 18, replace "800ºC." by -- 800ºC --; replace "700ºC." by -- 700ºC --; replace "750ºC." by -- 750ºC --; replace "900ºC." by -- 900ºC --; replace "950ºC." by -- 950ºC --;  
Line 19, replace "980ºC." by -- 980ºC --; replace "1000ºC." by -- 1000ºC --; replace "1,100ºC." by -- 1,100ºC --;  
Line 34, replace "800ºC." by -- 800ºC --; replace "950ºC." by -- 950ºC --;

Signed and Sealed this

Tenth Day of June, 2003

JAMES E. ROGAN  
*Director of the United States Patent and Trademark Office*